United States Patent [19]
Atkins

[11] Patent Number: 5,350,196
[45] Date of Patent: Sep. 27, 1994

[54] RETRACTION LOCKING DEVICE FOR RESTRAINING BELT

[76] Inventor: George Atkins, 61a Oseney Crescent, Kentish Town, London, United Kingdom, NW5 2BE

[21] Appl. No.: 909,242

[22] Filed: Jul. 6, 1992

[30] Foreign Application Priority Data

Jul. 3, 1992 [GB] United Kingdom ............... 9114359

[51] Int. Cl.⁵ .................... B60R 22/30; A44B 11/12
[52] U.S. Cl. .................... 280/808; 297/483; 24/170
[58] Field of Search .............. 280/808; 297/483; 24/170, 191

[56] References Cited

U.S. PATENT DOCUMENTS

| | | | |
|---|---|---|---|
| 3,011,237 | 12/1961 | Prete, Jr. | 24/170 |
| 3,646,644 | 3/1972 | Watts | 24/170 X |
| 4,387,489 | 6/1983 | Dudek | 24/170 X |
| 4,726,625 | 2/1988 | Bougher | 280/808 X |
| 4,893,835 | 1/1990 | Linden | 280/808 |
| 5,000,481 | 3/1991 | Willson | 280/808 |

FOREIGN PATENT DOCUMENTS 2652862  4/1991  France ............... 280/808
2118823  11/1983  United Kingdom .

Primary Examiner—Margaret A. Focarino
Assistant Examiner—Peter C. English
Attorney, Agent, or Firm—Weingarten, Schurgin, Gagnebin & Hayes

[57] ABSTRACT

A device (1) for attachment to a restraining belt is disclosed comprising a casing (3) for enveloping widthwise the restraining belt; a cam (5) rotatably mounted in the casing (3) along an axis extending substantially parallel to the length of the belt, and an element (7) for rotating the cam (5) from a neutral position in which the cam (5) does not make contact with the belt, to a clamping position in which the cam (5) grips the belt. A restraining belt system incorporating the device (1) is also disclosed. The device (1) obviates the problem of tension exerted on wearers of restraining belts, is both safe and cheap to manufacture and can be fitted easily to existing vehicle seat belts.

7 Claims, 1 Drawing Sheet

RETRACTION LOCKING DEVICE FOR RESTRAINING BELT

The present invention relates to a device for attachment to a restraining belt and particularly but not exclusively, to a device for attachment to a seat belt to provide slack on the belt without affecting the safety operation of the belt.

Vehicles are provided with seat belts so as to be fixed across the body of the wearer in the vehicle seat to restrain the wearer in the event of an impact at speed, for example a collision with another vehicle.

A conventional inertia reel seat belt for the front seat of a car is typically a belt of about 5 cm wide, the majority of which is stored on a reel fixed to the floor at the door side of the passenger or driver's seat at one end, and fixed to the floor of the vehicle near the reel at the other end. In each case, the belt extends upwardly from the reel to an upper anchoring point near the top of the seat door and returns down to the floor. A buckle slidable along the downwardly extending part of the belt locks into a buckle fastener located at the other side of the seat so that, when fastened, the belt extends diagonally over the shoulder and chest of the wearer to the buckle fastener and then horizontally across his lap to where it is fixed on the floor.

The reel has a geared safety mechanism which locks the belt to prevent any further unreeling when there is a sudden movement forward of the wearer, such as would be experienced in the event of sudden braking of the vehicle.

When the seat belt is locked into the fastener, because the belt is tensioned, the seat belt exerts a small pressure on the wearer. This is uncomfortable for the wearer and in particular for drivers and passengers on long distance journeys or for wearers in hot climates.

A further problem caused by the tension of seat belts is that the belt can cause creasing and soil the wearer's clothing. Also, the device would encourage drivers to use their safety belts by removing causes of discomfort rather than being encouraged by legislation.

Previously new designs for seat belt mechanisms have been proposed which involve additional gearing in the reel housing to provide a certain amount of slack on the seat belt. However, such designs often have met with safety problems. Also, such new seat belt designs are expensive and inconvenient to fit into vehicles which already have a seat belt system.

An aim of the present invention is to provide a device which obviates the problem of tension exerted on wearers of restraining belts, which is both safe and cheap to manufacture and which can be fitted easily to existing vehicle seat belts.

According to a first aspect of the present invention there is provided a clamping device for a restraining belt, comprising a casing for enveloping widthwise said restraining belt; a cam rotatably mounted in the casing along an axis extending substantially parallel to the length of the belt, and means for rotating the cam from a neutral position in which the cam does not make contact with the belt, to a clamping position in which the cam grips the belt.

Preferably the casing is C-shaped in cross-section, the interior of the casing defining a slit to snugly receive said restraining belt.

Preferably the cam is mounted on the casing by a roll-pin which passes through a bore in the cam and corresponding bores in the casing so that the pin extends along the axis of rotation of the cam.

Preferably the means for rotating the cam comprises a lever for manually rotating the cam. The lever preferably has a stop to prevent the cam from rotating beyond the neutral position when it is rotated from the clamping position.

Preferably all the edges of the device are smooth to prevent snagging and wear of the belt webbing and the inner surface of the interior of the casing opposite the cam may be roughened to aid gripping of the belt by the cam and prevent the belt from slipping through the casing.

Preferably the lever and cam are integrally formed from an injection moulded plastic, the casing is formed from an injection moulded plastic and the roll-pin is metallic. Alternatively, the lever, cam and casing may also be formed from a non-ferrous metal.

According to a second aspect of the present invention there is provided a restraining belt system comprising, a belt; an inertia reel for storing part of the belt; an anchor for the belt positioned to allow the belt to slide therethrough; and a clamping device, said clamping device comprising a casing for enveloping widthwise said restraining belt, a cam rotatably mounted in the casing along an axis extending substantially parallel to the length of the belt, and means for rotating the cam from a neutral position in which the cam does not make contact with the belt, to a clamping position in which the cam grips the belt, wherein, in use, the clamping device grips the belt and is disposed abuting the anchor on the other side of the anchor from the inertia reel to enable tension imparted by the inertia reel on the belt not to be imparted on part of the belt beyond the clamping device.

Other features and advantages of the present invention will become apparent from the following description and accompanying claims.

An embodiment of the present invention will now be described by way of example with reference to the accompanying drawings, in which.

Figure 1:
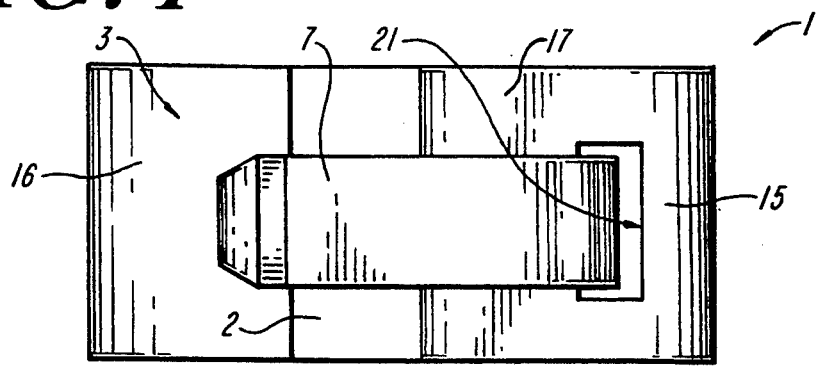
FIG. 1 is a plan view of an embodiment of the present invention.

The embodiment shown in FIGS. 1 to 4 comprises a clamping device 1 having a casing 3, a cam 5 with an integral lever 7, and a roll-pin 9.

The casing 3 is generally C-shaped in cross-section with a lower plate 2 and a pair of flanges 15, 16. The interior of the casing 3 defines a slit 11 to snugly envelop the width of a short length of a seat belt (not shown). In the embodiment illustrated the slit is approximately 5 cm wide and 1.5 mm deep to envelop a 5 cm wide vehicle seat belt.

The flange 15 of the C-shaped casing 3 has a raised portion 17 through which there extends a bore 19 substantially parallel with the longitudinal dimension of the belt. The flange 15 has a central recess 21 adapted to receive the cam 5.

The cam 5 has a bore 23 extending along its axis, approximately equal in diameter with the bore 19 in the casing 3.

During assembly, the cam 5 is rotatably mounted in the recess 21 on a metal roll-pin 9 which extends through aligned bores 19 and 23.

Figure 2:
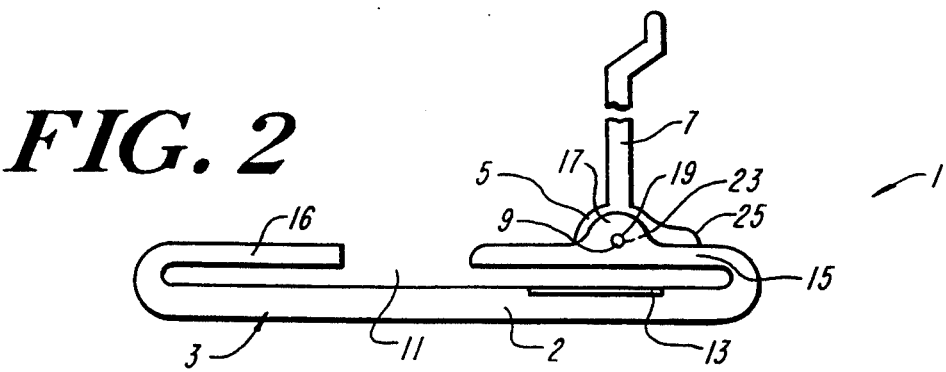
FIG. 2 is a side view of the embodiment of FIG. 1 in a first position.
Figure 3:
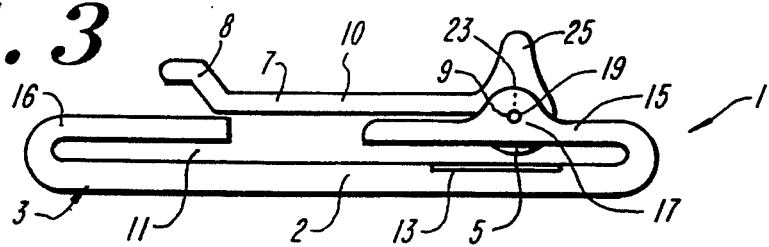
FIG. 3 is a side view of the embodiment of FIG. 1 in a second position.
Figure 4:
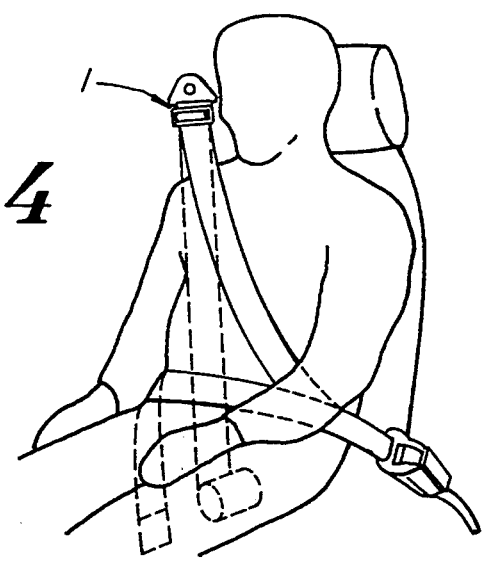
FIG. 4 illustrates the embodiment of the restraining belt system.

The cam 5 is manually rotated about the pin 9 by movement of the lever 7 from a neutral position, as shown in FIG. 2, to a clamping position, as shown in FIG. 3. The cam 5 is shaped so that in the neutral position the cam 5 clears the belt webbing (not shown) located in the slit 11 and in the clamping position the cam 5 bears against the belt to grip the belt lengthwise along the webbing.

The described embodiment is designed to cause minimal wear to the seat belt webbing. This is because the cam shaft bears lengthwise along the belt as opposed to horizontally across the belt webbing. The lever 7 has a raised end region 8 at an end distal to the cam 5 and separated from it by a straight portion 10. In the clamping position the portion 10 of the lever rests on the opposite flange 16 of the casing 3.

The lever 7 is raised at its end so that in the clamping position the lever rests on the opposite flange 16 of the casing 3.

A stop in the form of a shoulder 25 on the cam 5 is provided to abut against the flange 15 to keep the lever 7 in the neutral position and prevent it from rotating beyond the neutral position when rotated from the clamping position.

In this embodiment the upper surface 13 of the lower plate 2 is roughened to provide friction between the belt webbing and the clamping device 1 to enhance gripping of the cam 5 against the belt webbing.

The clamping device 1 is used in a vehicle front-seat belt as follows.

The device 1 is initially set in the neutral position. The wearer fastens the seat belt and slides the clamping device 1 up along the belt to abut the anchor. Holding the device against the anchor, the wearer then adjusts the diagonal and horizontal portions of the belt for comfort by pulling the belt approximately 2.5 to 5 cm through the device 1. When the wearer is comfortable he can fasten the clamping device 1 by moving the lever 7 to the clamping position against the casing 3.

It will be appreciated that the dimensions of the cam and slit are chosen for optimum gripping effect with acceptable wear on the belt.

Preferably the casing 3 is formed from an injection moulded plastic.

The cam 5 and integral lever 7 may also be formed from an injection moulded plastic.

In the described embodiment the stop which prevents the lever 7 from rotating beyond the neutral position when rotated from the clamping position, is in the form of a shoulder 25 on the cam 5. It it will be appreciated that the stop could equally be a protrusion or shoulder on the casing 3 which abuts against the cam 5.

In the embodiment illustrated the lever 7 is raised at its end which is convenient for manual movement of the cam 5. However, it is envisaged that the end of the lever 7 could equally be flat and lie in a recess in the flange 16 so that the lever 7 lies level with the flange 16.

It will be understood that the clamping device of the present invention can be designed to be fitted to any kind of body retaining belt or harness or strap.

For example, the device may be fitted to a baby harness, the device being slid along the belt to abut against the belt storage housing.

Another application of the device is to fit it to a boat harness.

Various modifications may be made to the described embodiment and it is desired to include all such variations and modifications as fall within the scope of the accompanying claims.

I claim:

1. A removable clamping device for use with a restraining belt system, said system having a belt, an inertial reel for storing part of the belt, and an anchor for the belt positioned to allow the belt to slide therethrough, the removable clamping device comprising:
    a C-shaped casing, said casing having a laterally extending lower plate and cantilevered flanges extending from said lower plate a distance over the lower plate and leaving a gap between the flanges for belt insertion and removal to and from a position within said casing intermediate belt ends, said belt extending laterally between said lower plate and flanges, for releasably enveloping widthwise said restraining belt;
    a cam having a progressive curvilinear surface, rotatably mounted in the casing by a roll-pin which extends along an axis extending substantially parallel to the length of the belt;
    lever means for manually rotating the cam from a neutral position with the lever means facing away from the casing in which the cam does not make contact with the belt, to a clamping position with the lever means lying along the casing and covering the gap between the casing flanges in which the cam grips the belt along a length of said belt tangent to the curvilinear surface of the cam in a confined width portion of the belt; and
    stop means disposed on said lever means to prevent the cam from rotating away from the clamping position beyond the neutral position when the lever means is rotated from the clamping position.

2. A device according to claim 1, wherein edges of the C-shaped casing are smooth to prevent snagging and wear of the belt.

3. A device according to claim 1, wherein an inner surface of the C-shaped casing opposite the cam is roughened to aid gripping of the belt by the cam and to prevent the belt from slipping through the C-shaped casing.

4. A device according to claim 1, wherein the lever means and cam are integrally formed from a plastic.

5. A device according to claim 1, wherein the C-shaped casing is formed from a plastic.

6. A device according to claim 1, wherein the roll-pin is formed from a metal material.

7. A device according to claim 1, wherein the lever means, cam and C-shaped casing are formed from a non-ferrous metal.

* * * * *